US009946803B2

(12) United States Patent
Karakotsios et al.

(10) Patent No.: US 9,946,803 B2
(45) Date of Patent: Apr. 17, 2018

(54) THREE-DIMENSIONAL INTERFACE FOR CONTENT LOCATION

(71) Applicant: Amazon Technologies, Inc., Reno, NV (US)

(72) Inventors: Kenneth M Karakotsios, San Jose, CA (US); Bradley J Bozarth, Sunnyvale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 64 days.

(21) Appl. No.: 14/480,390

(22) Filed: Sep. 8, 2014

(65) Prior Publication Data
US 2015/0062121 A1 Mar. 5, 2015

Related U.S. Application Data

(63) Continuation of application No. 12/732,083, filed on Mar. 25, 2010, now Pat. No. 8,830,225.

(51) Int. Cl.
G06T 15/00 (2011.01)
G06F 17/30 (2006.01)
(Continued)

(52) U.S. Cl.
CPC .......... *G06F 17/30873* (2013.01); *G06T 3/60* (2013.01); *G06T 15/00* (2013.01);
(Continued)

(58) Field of Classification Search
CPC ................................ G06T 19/00; G06T 17/20
(Continued)

(56) References Cited

U.S. PATENT DOCUMENTS 6,499,029 B1 * 12/2002 Kurapati ........... G06F 17/30817
707/750
6,879,322 B2 4/2005 Iida et al.
(Continued)

FOREIGN PATENT DOCUMENTS

WO WO 2008/064785 6/2008

OTHER PUBLICATIONS

Cornell, J., "Does This Headline Know You're Reading It?" *h+ Magazine*, Mar. 19, 2010, located at http://hplusmagazine.com/articies/ai/does-headline-know-you%E29/080%99re-reading-it, last accessed on Jun. 7, 2010, 4 pages.
(Continued)

*Primary Examiner* — Jin Ge
(74) *Attorney, Agent, or Firm* — Polsinelli LLP

(57) ABSTRACT

Instances of content, such as search results or browse items, can be displayed using a plurality of three-dimensional elements, with selected pieces of information for each instance placed upon faces, sides, or other portions of those elements. A user can view similar information for each of the instances of content by rotating the elements, such as by interacting with an input element or rotating a portable computing device rendering the elements. The user can apply various filtering criteria or value ranges, whereby the relative position of the elements in three-dimensional space can be adjusted based at least in part upon the applied values. By rotating the elements, applying criteria, and changing the camera view of the elements, a user can quickly compare a large number of instances of context according to a number of different criteria, and can quickly locate items of interest from a large selection of items.

20 Claims, 12 Drawing Sheets

(51) Int. Cl.
  *G06T 15/20* (2011.01)
  *G06T 19/20* (2011.01)
  *G06T 3/60* (2006.01)

(52) U.S. Cl.
  CPC .............. *G06T 15/20* (2013.01); *G06T 19/20* (2013.01); *G06T 2219/2016* (2013.01)

(58) Field of Classification Search
  USPC ........................................................ 345/619
  See application file for complete search history.

(56) References Cited

U.S. PATENT DOCUMENTS

| | | | |
|---|---|---|---|
| 7,581,195 B2 | 8/2009 | Sciammarella et al. | |
| 2001/0050687 A1 | 12/2001 | Iida et al. | |
| 2003/0090524 A1 | 5/2003 | Segerberg et al. | |
| 2005/0204306 A1 | 9/2005 | Kawahara et al. | |
| 2006/0274060 A1* | 12/2006 | Ni et al. | 345/419 |
| 2007/0022020 A1 | 1/2007 | Bernstein | |
| 2007/0046630 A1* | 3/2007 | Hong et al. | 345/158 |
| 2007/0124699 A1 | 5/2007 | Michaels | |
| 2007/0226189 A1 | 9/2007 | Piekos et al. | |
| 2009/0019078 A1 | 1/2009 | Chisholm et al. | |
| 2009/0138376 A1 | 5/2009 | Smyers et al. | |
| 2009/0171813 A1 | 7/2009 | Byrne et al. | |
| 2009/0254454 A1 | 10/2009 | Gupta | |
| 2009/0303204 A1* | 12/2009 | Nasiri et al. | 345/184 |
| 2010/0076952 A1 | 3/2010 | Wang et al. | |
| 2010/0094856 A1 | 4/2010 | Rodrick et al. | |
| 2010/0188503 A1 | 7/2010 | Tsai et al. | |
| 2010/0291993 A1 | 11/2010 | Gagner et al. | |
| 2010/0309228 A1* | 12/2010 | Mattos et al. | 345/654 |

OTHER PUBLICATIONS

Thomas, J.T.P. et al., "Near Infrared Light Absorption in the Human Eye Media," *Vision Res.*, 1997, vol. 37, No. 2, pp. 249-253.

* cited by examiner

THREE-DIMENSIONAL INTERFACE FOR CONTENT LOCATION

BACKGROUND

As an ever-increasing amount of information is being made available electronically, typically over networks such as the Internet, it is increasingly difficult to locate information or other content that is of interest to a user. Many conventional systems utilize search engines that accept keywords or other types of queries from a user, and return results that most closely match the query. Oftentimes users do not enter precise queries, which results in the set of results being over-inclusive, forcing the user to navigate through many results before locating the items of interest. Further, a user might specify more than one keyword or other search criterion, but has no way of indicating a relative importance of each of those criteria. In other conventional systems, users are able to browse through information, such as by navigating through several levels of categories or pages of electronic catalogs. The user is typically only able to see one page or category at a time, which can make it difficult or at least time consuming to navigate the various options.

Conventional approaches also can be difficult for a user when the user attempts to compare various instances of content, particularly where those results are on different pages or portions of a page that cannot readily be displayed simultaneously on a display screen. A user can attempt to refine queries, open additional windows, or perform other such operations, but such displays of information can be overly complicated and can make it difficult for a user to maintain context and be able to return to a previous result state if desired. Further, some information such as product ratings or specifications might only be contained on specific product pages or display pages, for example, such that a user must open multiple pages at the same time to compare various aspects of specific search results. Such approaches can be particularly problematic for mobile devices and other computing devices that have relatively small display screens, such that a user cannot easily view more than one page at a time. Further, the user often has no way of determining which and/or how many instances of content were excluded by the use of specific keywords or other criteria.

BRIEF DESCRIPTION OF THE DRAWINGS

Various embodiments in accordance with the present disclosure will be described with reference to the drawings, in which.

DETAILED DESCRIPTION

Figure 1:
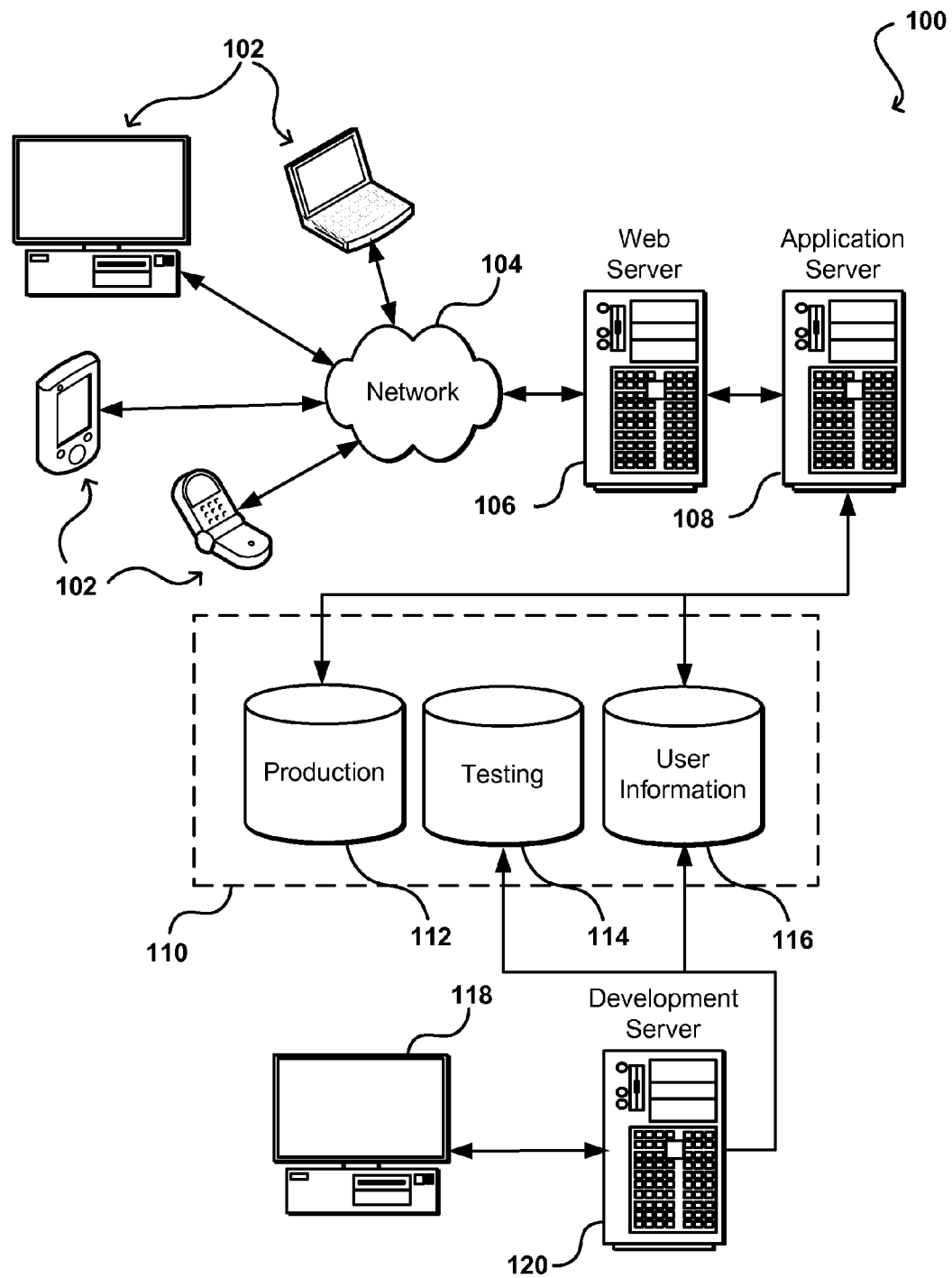
FIG. 1 illustrates an example an environment in which various embodiments can be implemented.

Systems and methods in accordance with various embodiments of the present disclosure may overcome one or more of the aforementioned and other deficiencies experienced in conventional approaches to controlling a display, interface, or other presentation of content in an electronic environment. Systems and methods in accordance with various embodiments utilize a plurality of three-dimensional content elements to concurrently display a potentially large number of instances of content in a relatively compact display area. Each content element can have multiple sides, faces, or other areas for displaying pieces of information for a given instance, and the various elements can include common types of information on common sides. Using such an arrangement, a user can compare similar aspects of multiple instances of content by causing the elements to rotate or otherwise change orientation, such that one, some, or all of the content elements display similar types of information for each instance.

A user also can apply various filtering criteria or ranges for the selected instances, which can cause the renderings of the content elements to be shifted in three-dimensional space. For example, elements near the top of a range can be rendered towards the top of three-dimensional space, while items near the bottom of the range can be rendered near the bottom of the space. The user then can change a position of a virtual camera with respect to the items such that the user can obtain a rendering from any angle, allowing the user to compare the relative positions of the various content elements. The user can also rotate the individual elements at any camera angle, such that the user can easily compare various aspects or criteria for a potentially large number of instances of content.

The user also can have the options to select specific instances for more detailed views or comparisons, and can have the ability to exclude certain instances from the view. The user also can be presented with various options for each element, such as selectable elements to purchase or download an item, or a link to a page containing more information about an item.

To provide the input for changes in rotation or view of the elements, for example, a user can utilize conventional inputs such as a mouse, keyboard, or touch screen. A user also can control various aspects in certain embodiments by adjusting an orientation of a portable computing device, such as by rotating or tilting the device. One or more elements can rotate in a direction and/or amount based at least in part upon the adjustment of the device. The change in position of the device can be determined using any of a number of different approaches, such as by utilizing an orientation determining element or performing image analysis. Image analysis also can enable a user to provide input through relative motion of the user, such as by moving the user's head or performing a specific motion.

Such approaches can enable a user to quickly compare and/or locate content in an intuitive manner. For example, a user can quickly locate a book on an electronic book reader by entering initial search information and comparing various book information, and a user of a portable media player can similarly locate music or movies using a similar approach. Various other applications can take advantage of aspects in accordance with the various embodiments as discussed and suggested herein.

As discussed, various approaches can be implemented in various environments for various applications. For example, FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or a development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
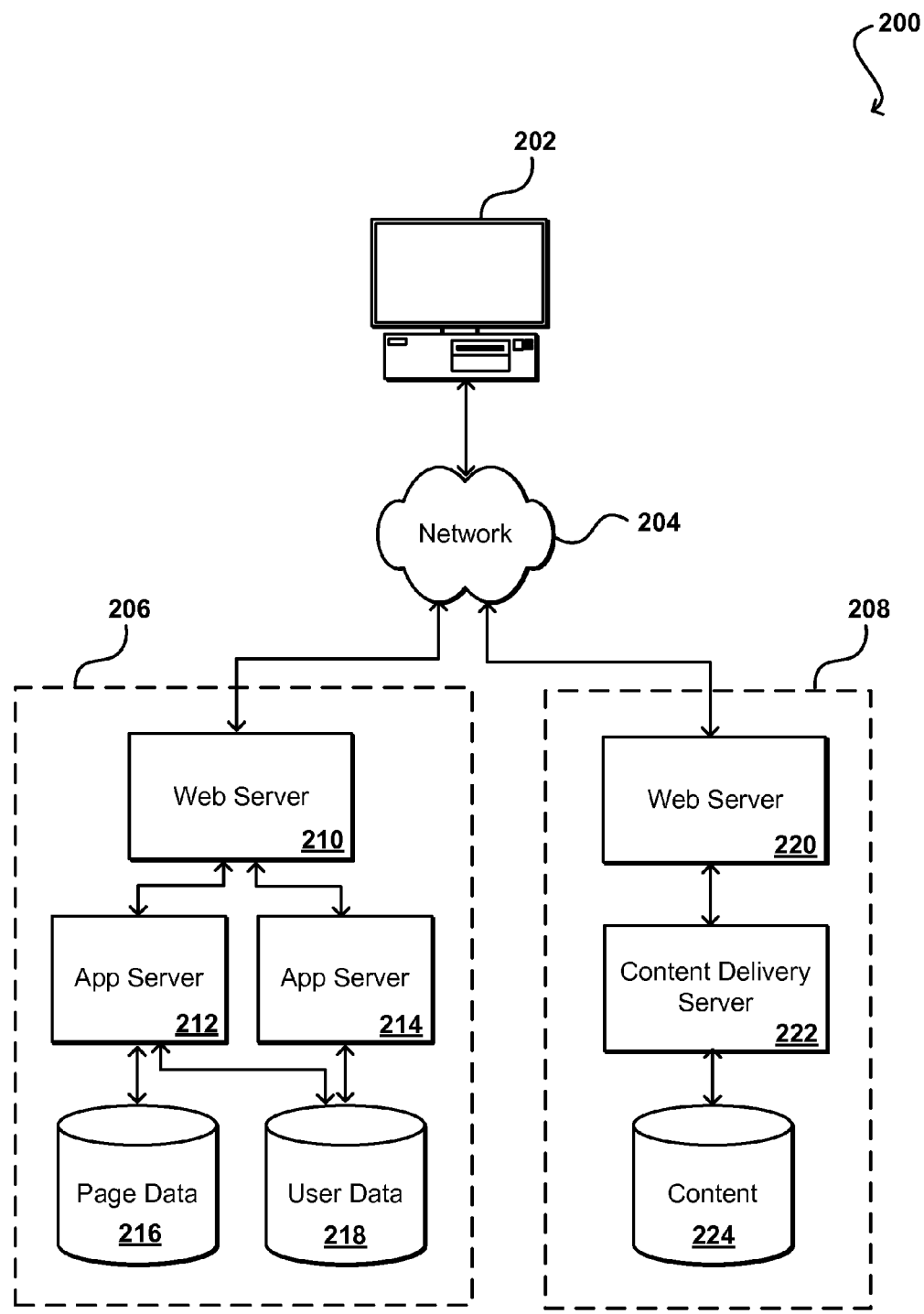
FIG. 2 illustrates components of a system that can be used to provide content in accordance with various embodiments.

An environment such as that illustrated in FIG. 1 can be useful for a provider such as an electronic marketplace, wherein multiple sources might be used to provide content for different portions of a generated page. The electronic environment thus include additional components and/or other arrangements, such as those illustrated in the example configuration 200 of FIG. 2. In this example, a user of a client device 202 might submit a request for content across a network 204 that is directed to at least one provider 206. In order to respond to the request, such as by sending a reply page to be displayed on the client device 202, content might be provided by a Web server 210 of a first provider, which might utilize one or more application servers 212, 214 to pull content from one or more data repositories 216, 218 and generate page content to be rendered by the client device 202. In some cases, each application server 212, 214 for the provider might correspond to a different domain. For example, a first application server 212 might correspond to a non-secure domain, which provides content such as landing pages or static content pages. A second application server 214 might correspond to a secure domain, which might provide functionality such as virtual shopping carts, online payments, and other such secure operations. The application servers can pull data from appropriate data stores when generating the content of a page, such as may include page data from a page data repository 216 and user data from a user data repository 218.

In at least some embodiments, an application server can include at least one search module operable to receive search requests or queries from end users, applications, or other such sources, and search against information in a local repository or across a network. The search can be run against at least one search index using any of a number of approaches known or subsequently developed in the art for searching for content. Further, some embodiments utilize a hierarchical categorization tree for organizing content, such as items (e.g., products or services) offered for consumption (e.g., purchase, rent, lease, or download). The application server can enable a user to browse content by navigating through an interface based at least in part upon the hierarchical categorization tree. As should be understood, the data repositories used for such purposes can be portions of a single repository or distributed across multiple repositories, and different or additional data sources can be used as desired. In some embodiments, a user can be presented with recommendations, suggestions, or other such grouping of content, which the user can browse or otherwise view as discussed elsewhere herein. In still other embodiments, a user can obtain instances of content by capturing information directly to a user device, such as by scanning bar codes, performing image recognition on product packaging, or detecting RFID information for various items in a store or other such location.

In order to provide all content to be included for the page, at least a portion of the content also might be provided by at least one other provider 208, such as an advertising entity providing advertising content or a third party retailer offering items for consumption through an electronic marketplace provided by the system. In this case, a Web server 220 might serve content from an application server 222, here a content delivery server, operable to pull content from at least one repository 224, such as may store advertising or merchandising content, and the server 222 might send the content directly to the client device 202 across the network 204 or in some embodiments might send the content to the first provider 206 such that the first provider sends all page content together. In this example, the second provider 208 also might correspond to a separate domain. Although two content providers are shown, and the example is described with respect to three domains for a page, it should be understood that any of a number of providers and/or domains could be used to provide content for a page as known or used in the art. Further, the supplemental content provided by the secondary provider 208 can include any appropriate content, such as descriptive or informational content, etc.

As known in the art, supplemental content can be displayed separately or alongside content from the primary content provider. For example, FIG. 3(a) displays a number of items offered for consumption, and it is possible that information for at least one of these items is provided by a third party provider, either dynamically in response to a user request or before the request by providing the information to the primary provider, etc. Various other approaches can be used as well within the scope of the various embodiments as would be apparent to one of ordinary skill in the art in light of the teachings and suggestions contained herein.

As discussed, users searching for specific content can perform any of a number of different operations to obtain a selection of relevant content, such as by submitting a search query into a search box or other such interface element, by browsing through categories of a hierarchical content tree, by following links to pages of related information, etc. Also, as discussed, users of conventional search systems typically receive an ordered list of content spread across multiple pages of content, which can make it difficult for a user to quickly locate specific content, compare various items of content, or perform any of a number of other such actions.

Figure 3A:
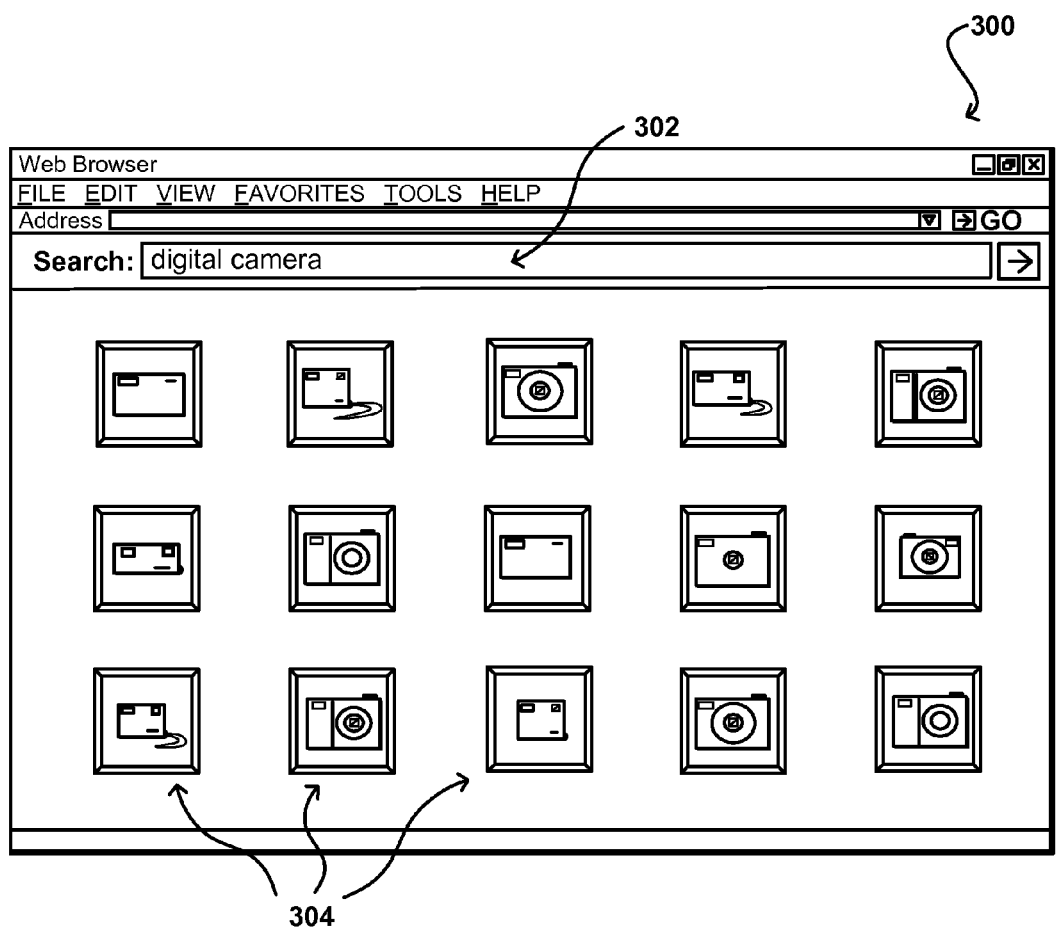
FIGS. 3(a)-3(b) illustrate an example approach to conveying content to a user through a graphical user interface that can be used in accordance with one embodiment.

Systems and methods in accordance with various embodiments address at least some of these and other deficiencies in existing content interfaces by providing a three-dimensional organization approach, such as that illustrated in the example display 300 of FIG. 3(a), wherein information for many instances of content can be displayed concurrently on a single display, in response to a user specifying search information or other such criteria, enabling a user to quickly locate and/or compare various items of content. While the examples presented herein will primarily relate to items (e.g., products or services) offered for consumption (e.g., buy, purchase, lease, or download) through an electronic marketplace, it should be understood that the context is merely an example and that approaches described or suggested within the scope of the various embodiments can relate to any appropriate types of content that can be searched for, or otherwise displayed in, a visual electronic interface.

In the example of FIG. 3(a), a user has entered a search query 302 relating to a digital camera. Using a system or service such as that described with respect to FIG. 2, a request can be generated and submitted by a client device, for example, and the search system or service will return information determined to match, or at least relate to, the submitted query. Various other ways for obtaining such results are known in the art and will not be discussed herein in detail. The client device can receive the results and render information for the results such that each instance of content, or at least each selected instance of content, from the results is displayed as part of a three-dimensional element, such as a virtual cube, block, or box 304 in an array of three-dimensional elements to be presented to the user. In this example, each box 304 is shown to initially display a common side or face (e.g., the "bottom" of the box) such that a common aspect of each instance of content can be displayed concurrently. In this example, an image of each product matching the search query is displayed, such that the user can quickly scan the results to select or view specific items of interest. Although only an image is shown for each box, it should be understood that the type and/or amount of information displayed can vary between embodiments, and can depend upon any of a number of factors, such as the size and/or resolution of the screen displaying the results. Further, in some embodiments different instances of content can be rendered using different shapes or types of element. For example, a first type of content might be displayed with a box, while a second type of content (e.g., accessories for items of the primary type of content) might be displayed using a pyramid or sphere, etc.

Figure 3B:
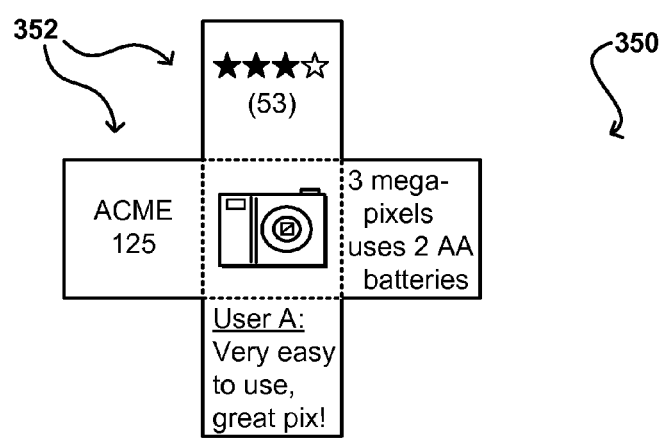

FIG. 3(b) illustrates an exploded example 350 of one of the boxes 304 displayed in FIG. 3(a). As can be seen, a "box" in this example comprises five faces 352, although any appropriate number of faces can be used in various embodiments. For example, each box could have a full six faces, or other shapes could be used such as a pyramid with four faces, etc. In some embodiments, a box can show five sides at any time (such as the bottom and four sides as illustrated in the figure), but can load data for all six sides, where the sides rendered can depend at least in part upon the rotation direction of the box (e.g., the current "top" of the box is not rendered in any given orientation of the box). In some embodiments, the five internal faces will each contain different information, such that the "bottom" and "sides" of the box will contain different information depending upon the orientation of the box (e.g., the information on a "side" of the box will change when the box is rotated such that the "side" is now the "bottom" of the box in the current orientation). In some embodiments, there can be different content displayed on the inside and on the outside of each side of the box. Various other rendering options can be used as well as should be apparent to one of ordinary skill in the art.

In this example, each face corresponds to information that could be found on a portion of a detail page or other display of information about the instance of content. For example, the bottom of the box displays an image of the product, while one side displays rating information, one side displays manufacturer and/or product naming information, one side displays selected specification information, and another side displays user reviews or other such information. It should be understood that the selections of information can vary between embodiments, and that some of the information can be combined onto a single side, etc. The sides 352 of the box can be virtually folded up, such that upon an initial display only the bottom side (or another selected side) of each box is displayed in the interface 300.

Figure 4A:
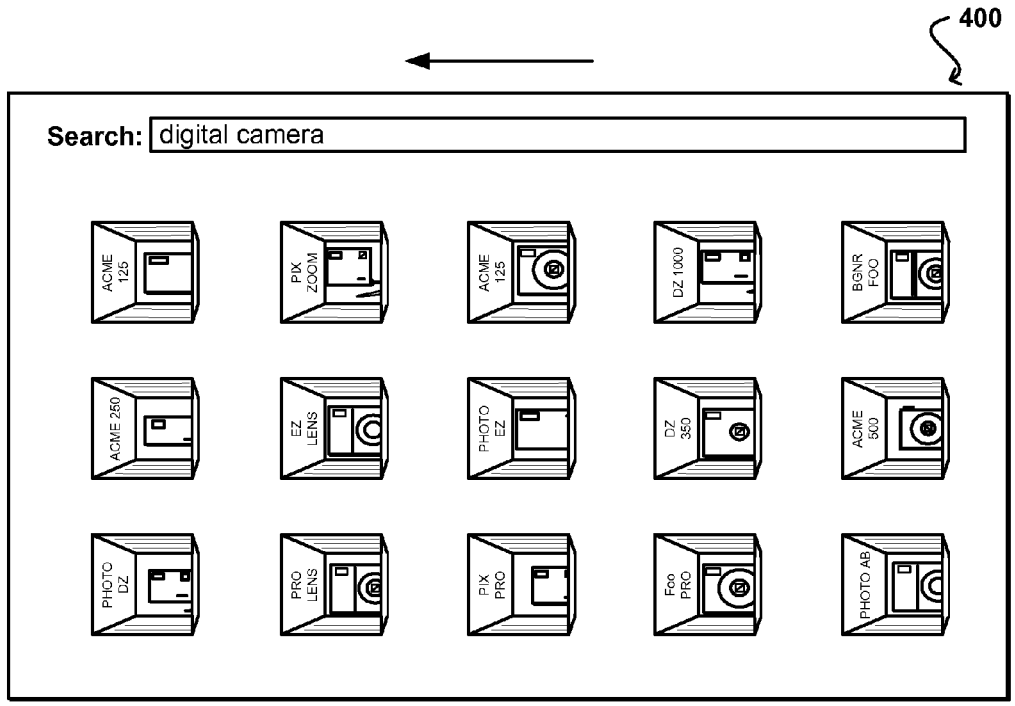
FIGS. 4(a)-4(b) illustrate alternative views of the interface display in FIG. 3(a) that can be presented in accordance with various embodiments.

Since the content elements displayed are two-dimensional representations of three-dimensional shapes, the interface can be configured to enable the user to rotate or otherwise change a point of view or rendering perspective, for example, that enables the user to view other information available for the various items. For example, in the example display 400 of FIG. 4(a), a user has performed a rotation or translation action, wherein the boxes displayed are effectively rotated in the display, such that in this example the left-most side of each box is displayed. Although the interface can also enable a user to rotate any individual box to obtain additional information, the interface enables the user to rotate all the boxes at substantially the same time, such that the user can compare specific aspects for each item. For example, the user was able to see images of the items in the initial display of FIG. 3(a), but by rotating the boxes left or right (as may be configurable as is known for inverting interface directions) as illustrated in FIG. 4(a), the user can compare information such as manufacturer and/or product name. As will be discussed elsewhere herein, a user can have the option at any time of selecting an element to be removed from the display, such as by selecting a box containing information about an item from a particular manufacturer, in which that the user is not interested. The interface also can enable the user to select specific items for viewing, such as by selecting specific boxes or applying filters as discussed elsewhere herein.

Figure 4B:
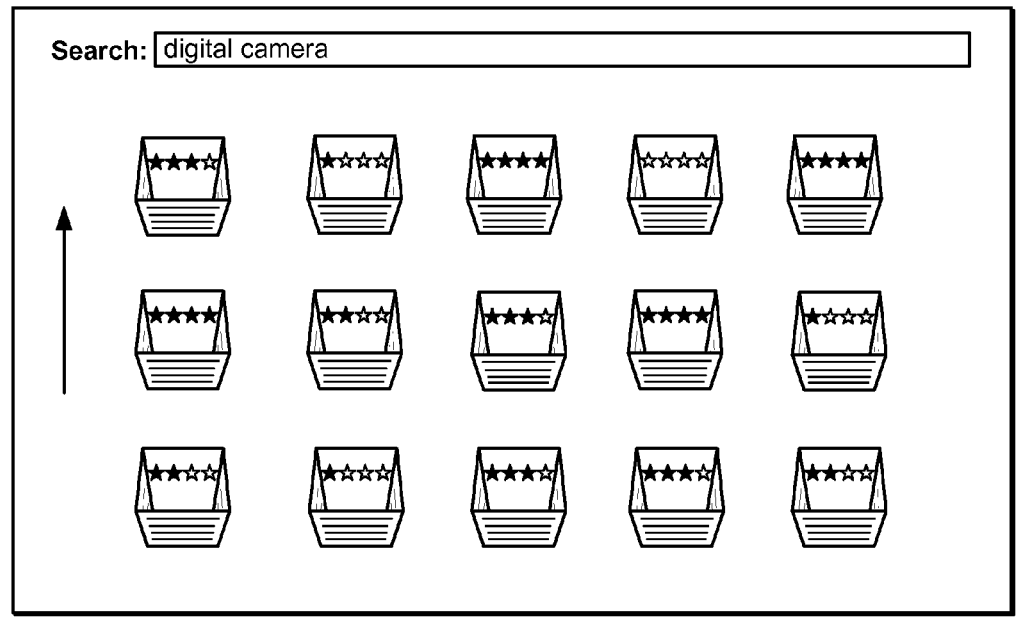

As shown in the example 450 of FIG. 4(b), the user can rotate or otherwise change the view of the boxes or other renderings of content in the display. Each change in the "virtual camera" or point of view can cause one or more sides of each box to be displayed. As illustrated in FIG. 4(b), a user can quickly determine the relative ratings of each item of content, and can select, exclude, or otherwise interact with the boxes of content as discussed elsewhere herein. The information displayed on each side of the boxes can be determined and/or rendered initially, or dynamically at approximately the time that a particular side is to be displayed. Similarly, the information can all be received initially from a server or remote service, for example, or can be requested and/or received at such time as particular information is to be displayed, such as may correspond to a side of the boxes being displayed that has not been displayed previously, or the user changing a selection of the boxes displayed such that information is to be displayed that was otherwise not displayed previously.

In order to rotate the boxes, the user can use any appropriate input mechanism to input a direction of rotation or any other such information. Using conventional interface approaches, for example, a user can input a direction by moving a mouse to drag a cursor in a particular direction across a screen, press arrows or other keys on a keyboard or keypad, move a trackball or touchpoint to input a direction of rotation, or swipe a finger across a touch screen in a desired direction. Various other types of input can be received using any appropriate technique known or subsequently developed in the art for such purposes. Also, the content elements can be displayed in any appropriate arrangement, and are not limited to rows, arrays, or other such configurations.

Figure 5A:
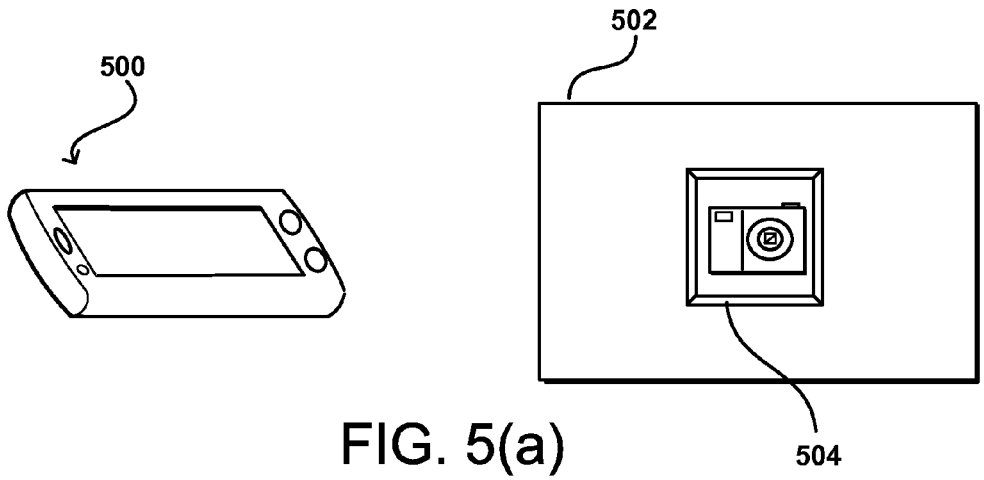
FIGS. 5(a)-5(c) illustrate approaches to altering the display of a three-dimensional object on a computing device in accordance with one embodiment.
Figure 5B:
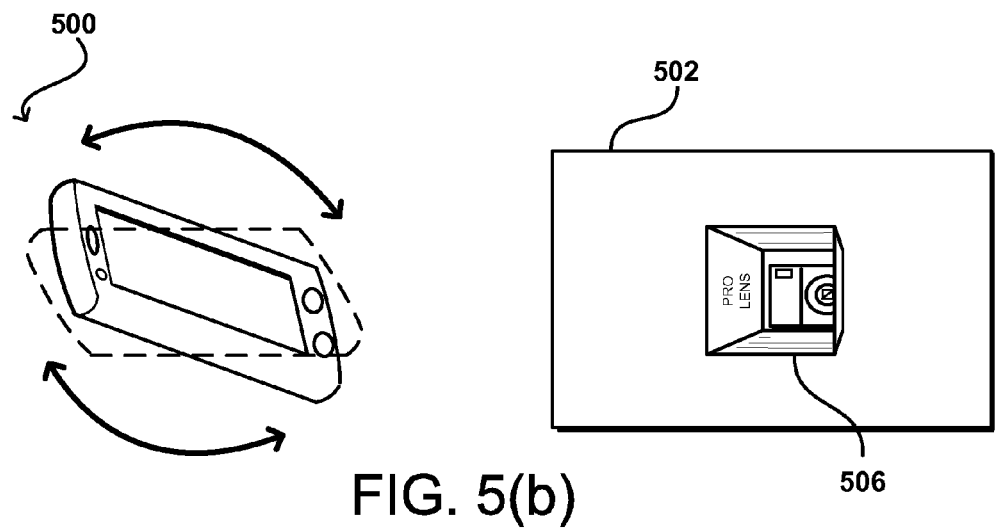
Figure 5C:
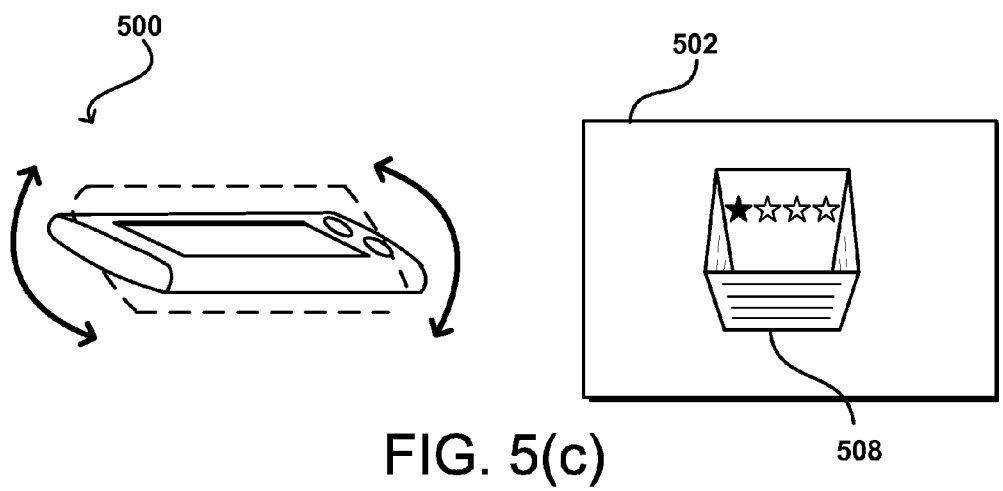

For devices such as handheld or portable devices, however, the rotation of the displayed items can be controlled at least in part by a corresponding rotation or other such movement of the device itself. For example, FIGS. 5(a)-5(c) illustrate embodiments of approaches that can be used to provide input to control rotation or other aspects of a display on a portable device. In some embodiments, this can be accomplished without using conventional input devices such as real or virtual keys on a keyboard, keypad, or other such entry device. In this example, a user is attempting to view information for an instance of content corresponding to a particular item, using a portable device 500. As can be seen, the device includes a display element 502 that allows the content 504 to be displayed to the user. As discussed above, the initial display of information can include a default page of a three-dimensional rendering of the selected content.

As shown in FIG. 5(b), one method for providing input to the device is to tilt the device to the right or left, which corresponds to rotating the item of content to the right or left, respectively (or depending upon user preference, to the left or right, respectively), in order to display a particular face 506 of the box of content. Similarly, FIG. 5(c) illustrates that a user can tilt the device forward or back to rotate the box up or down in the display, respectively (or down or up, respectively), to show another side 508 of the box of content. The relative rotation of the device can be detected using any appropriate element or input, such as an accelerometer or gyro element that is able to detect the motion of a device.

In some embodiments, the user can rotate the boxes freely in any direction by tilting the device, such as may show at least a portion of multiple faces of a box at any time. In other embodiments, the user can tilt the box(es) either across or up and down with a first motion, and can perform an action such as pressing a button on the device or bringing the device back to a default orientation to stop that motion. The user then can rotate the box(es) in the orthogonal direction by tilting the device in the appropriate direction. As should be apparent, various other combinations and navigations or movements can be performed using similar approaches. Further, although described with respect to tilting the device, it should be understood that other motions as discussed herein can be used as well in various embodiments.

The interface thus can render the box using a rotation that corresponds to motion of the device, such that the method of rotating the rendered boxes is intuitive to the user. The amount of rotation of the box can be greater than the amount of rotation of the device, for example, as requiring a user to rotate the device 90 degrees to view a side of the box would not work in many situations because the display element is on the front of the device. In some embodiments, there can be a mapping or proportional amount of rotation, such that a 5 degree rotation of the device might correspond to a 45 degree rotation of a rendered box, while a 10 degree rotation of the device corresponds to a 90 degree rotation of the box. In the box example with only five sides, no more than a 90 degree rotation is needed to view any information rendered on any side of a box.

In other embodiments, the amount of rotation of the device can correspond to the speed of rotation of the boxes. For example, a user might tilt a device by five degrees to slowly rotate the box, and can continue holding the device at that angle to continue rotating the box. In some embodiments, the user can cause the box to spin 360 degrees and continue spinning until the user again tilts the device back to the default position, presses a button, or performs another such action. The more the user tilts the device, the faster the item spins.

In some embodiments, the boxes can be configured to "snap" to the next side, such that tilting the device to the right, for example, can cause all the boxes displayed to flip or otherwise change to show a particular side. A separate tilting motion could be required each time a user wants to flip a box to show another side, etc.

Figure 6:
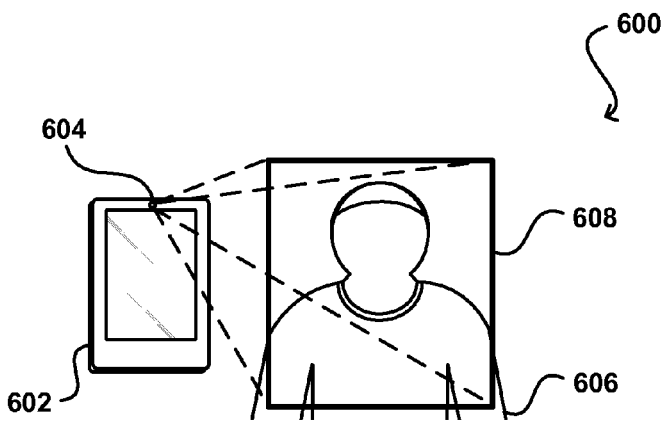
FIG. 6 illustrates an example approach to determining a relative orientation between a computing device and a user that can be used in accordance with one embodiment.

The relative motion of the device in some embodiments also can be determined, at least in part, by using image capture and analysis. For example, FIG. 6 illustrates an example configuration 600 wherein a mobile device 602 includes a camera or other imaging element 604 that is able to capture an image of at least a portion of a user 606 of the device when the user is in front of the device, such as would normally occur when the user is viewing the display element of the device. It should be understood that the relative orientation of the user and the device shown in the figure is shifted for purposes of explanation, and that the user generally faces the front (or other face or side) of the device that includes a display element and the imaging element 604. The imaging element 604 may include, for example, a camera, a charge-coupled device (CCD), a motion detection sensor, or an infrared sensor, among many other possibilities. It should also be understood that, while a smart device 602 is depicted in this example, the portable computing device could be any appropriate device able to receive and process input commands, such as a personal computer, laptop computer, television set top box, cellular phone, PDA, electronic book reading device, video game system, or portable media player, among others.

In this configuration, the imaging element 604 is on the same general side of the portable device 602 as a display element, such that when a user is viewing the interface in the display element the imaging element has a viewable area 608 that, according to this example, includes the face of the user 606. While in some embodiments the imaging element is fixed relative to the device, in other embodiments the imaging element can be operable to track the position of the user, such as by rotating the imaging element or an optical element (e.g., a lens, mirror, etc.) that directs light to the imaging element. Although embodiments described herein use examples of the viewable area including the face of the user, the viewable area may include other portions of the body such as arms, legs, and hips, among other possibilities. In any case, the viewable area 608 of the imaging element can be configured to obtain image information corresponding to at least a portion of a user operating the device, and if the imaging element is continually (or at least substantially continually) capturing or otherwise obtaining image information, then any movement of the user 606 relative to the device 602 (through movement of the user, the device, or a combination thereof) can cause a position or orientation of at least one aspect of that user within the viewable area 608 to change. If the device includes software and/or hardware that is able to locate at least one feature of the user that can be consistently determined, such as the eyes, nose or mouth of the user, then the device can analyze the image information to determine relative motion over a period of time and utilize that relative motion as input.

For example, a user can tilt the device or rotate the user's head, such as to nod up and down, in a "yes" motion. Such motion can be detected and analyzed by the imaging element (e.g., camera) as the position of the user's eyes in the viewable area 608 will move in the images. Further, aspects such as the imaged shape, size, and separation of the user's eyes also can change. Movement of the eyes in the viewable area could also be accomplished by moving the device up and down while the user remains still, as well as through other such motions. In some embodiments, the device is able to distinguish between movement of the user and movement of the device, such as by detecting movement of a background or other aspect of the images, or by analyzing the separation, shape, or size of various features. Thus, in embodiments described anywhere in this description that use an imaging element to determine an orientation or location of the device relative to its user, a user can have an option of inputting a given type of motion, corresponding to a specific command, by moving the device or altering an aspect of the user, or both.

As described above, when using the imaging element of the computing device to detect motion of the device and/or user, the computing device can use the background in the images to determine movement. For example, if a user holds the device at a fixed orientation (e.g., distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation even though the orientation of the device with respect to the user has not changed.

In some cases, relative movement could be open to multiple interpretations. For example, in one application a device might be programmed to perform a first action if the device is moved up and/or down, and a second action if the device is instead tilted forward or backward. As should be apparent, each action can correspond to the position of the user's eyes moving up and/or down in the viewable area. In some embodiments, as will be discussed below, the camera and detection may be sensitive enough to distinguish between the two motions with respect to how the user's face changes in the captured images, such as the shape and separation of various features or other such aspects. In other embodiments, where it may be desirable for the process to utilize a fairly simple imaging element and analysis approach, it can be desirable to include at least one orientation determining element (e.g., an accelerometer or gyro) in the device that is able to determine a current orientation of the device 602. In one example, the at least one orientation determining element includes at least one single- or multi-axis accelerometer is used that is able to detect factors such as three-dimensional position of the device, the magnitude and direction of movement of the device, as well as vibration, shock, etc. Other elements for detecting orientation and/or movement can be used as well within the scope of various embodiments for use as orientation determining element. When the input from an accelerometer is used with the input from the camera, the relative movement can be more accurately interpreted, allowing for a wider range of input commands and/or a less complex image analysis algorithm. For example, use of an accelerometer can not only allow for distinguishing between lateral and rotational movement with respect to the user, but also can allow for a user to choose to provide input with or without the imaging element. Some devices can allow a user to specify whether input is to be accepted from the imaging element, the orientation determining element, or a combination thereof.

Figure 7A:
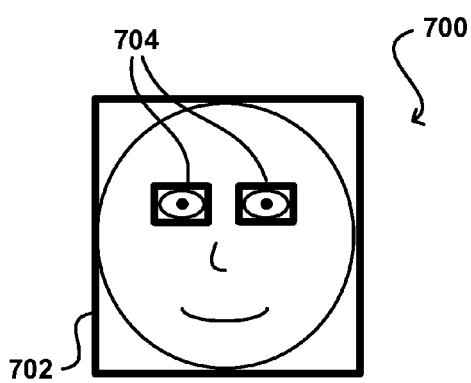
FIGS. 7(a)-7(d) illustrate examples of movements that can be recognized as input in accordance with one embodiment.
Figure 7B:
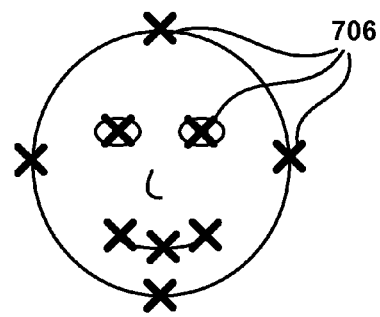

The device 602 can store, or otherwise have access to, at least one algorithm to analyze the captured images, as may be stored at least temporarily on the device itself, or can send the images to be analyzed by a remote computer or service, etc. Any of a number of algorithms can be used to analyze images, detect features, and track variations in the positions of those detected features in subsequent images. For example, FIG. 7(a) illustrates an example wherein an algorithm can analyze images to detect an approximate head location 702 in an image, and/or the relative position of facial features in the image, such as the approximate location of the user's eyes 704 in the image. Such information can be helpful to determine rotations of the user's head in addition to relative translations or movements with respect to the device. FIG. 7(b) illustrates an example that can be used with another algorithm, wherein the positions 706 of specific features of a user's face (or other body portion) are determined and tracked to detect changes in position in subsequent images. Tracking the relative motions can enable a user to provide input to the device by moving the user's head or body, moving the device, or a combination thereof.

Figure 7C:
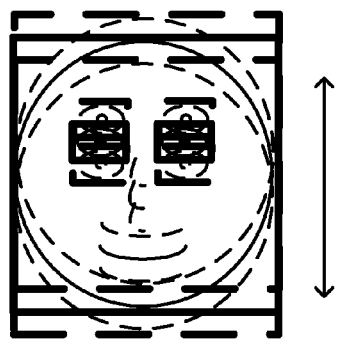
Figure 7D:
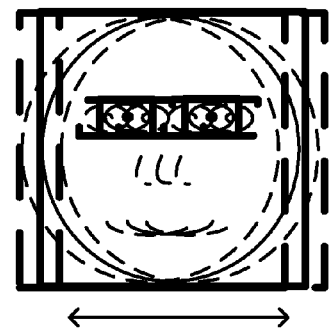

For example, FIG. 7(c) illustrates an example motion that could be captured by the device when either the user shakes the user's head up and down, rotates the device back or forward, or translates the device up and down, for example. FIG. 7(d) illustrates a similar example for side motion. By detecting any of these motions, or combinations thereof, using image capture, motion detection, or another appropriate technique, a user can provide input to the device to control rotation of the displayed content, or other such aspects, without requiring traditional input methods as discussed above.

Figure 8:
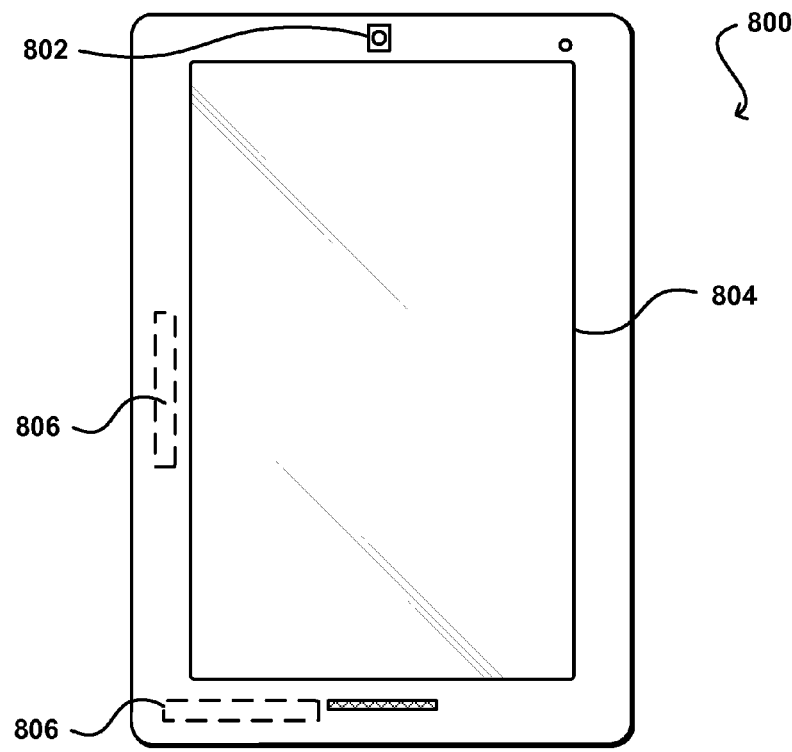
FIG. 8 illustrates an example device including components that can be used to provide input in accordance with various embodiments.

FIG. 8 illustrates an example of an electronic computing device 800 that can be used to provide such input in accordance with various embodiments. This example relates to a portable device that includes a display screen 804 and at least one orientation-determining element 806, such as an accelerometer, which can be used to help interpret motion in a captured image using various approaches as discussed above. As discussed, the device also includes an image capture element for capturing image information about the user of the device. While the device is described with respect to an ambient light camera, it should be understood that other elements such as an infrared (IR) emitter and detector configuration, or other such imaging elements, can be used within the scope of the various embodiments. The imaging element(s) can be positioned on the device in locations that are least likely to interfere with the user's comfortable operation of the device. As discussed, using multiple input mechanisms can help to interpret information captured about the user, such as to distinguish the movement of a user's head versus movement of the computing device.

Figure 9:
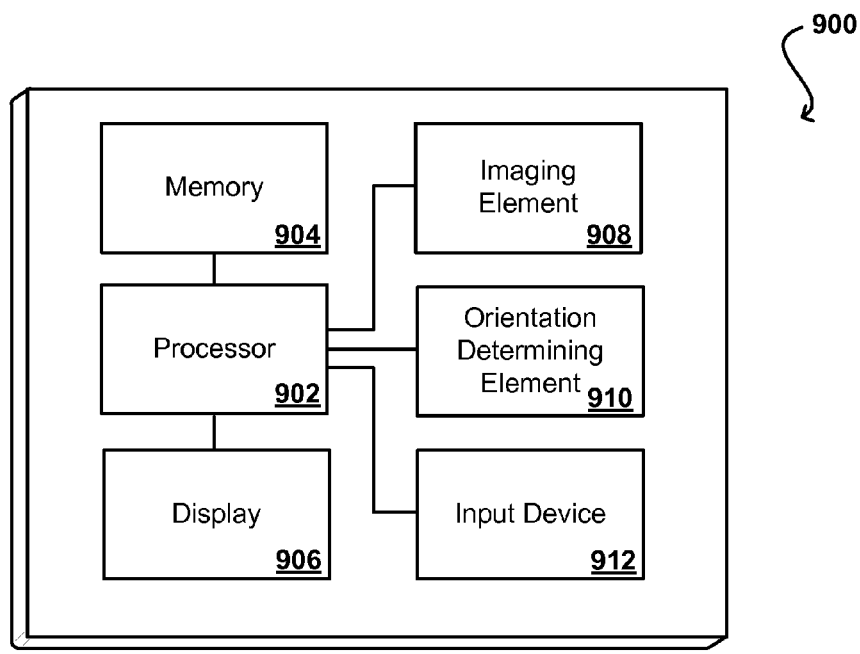
FIG. 9 illustrates an example component-level view of a device that can be used in accordance with various embodiments.

FIG. 9 illustrates a set of basic components of a computing device 900 such as the device 800 described with respect to FIG. 8. In this example, the device includes a processor 902 for executing instructions that can be stored in a memory device or element 904. As known in the art, the device can include many types of memory, data storage, or computer-readable media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one imaging element 908 such as a camera that is able to image a facial region of a user. The imaging element can include any appropriate technology, such as a CCD imaging element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

As discussed, the device also can include an orientation detection element 910 able to determine and/or detect orientation and/or movement of the device. Methods for using elements such as accelerometers to determine orientation or movement of a device are also known in the art and will not be discussed herein in detail. In some embodiments the device can include at least one additional input device 912 able to receive conventional input from a user. This conventional input can include, for example, a push button, touch pad, touch screen, wheel, joystick, keyboard, mouse, keypad, or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, any detectable amount of motion can be utilized as input. Because a user might not be able to hold a device perfectly still, however, particularly when holding a device in one hand, there can be at least a threshold amount of movement (e.g., an input threshold) required in order to cause a function to be performed. For example, a user might have to tilt the device at least five degrees in order to cause an element to scroll or rotate. The orientation can be relative, such as where a "normal" orientation occurs when a plane of the display of the device is substantially orthogonal to a direction of viewing between the device and the user's eyes. Even when a device rotation is detected, if there is a corresponding movement of the user (such as where a user sits back or lays down) then there may not be any input registered as the "relative" orientation has not changed. In some embodiments, only movements relative to this "normal" orientation are registered.

Figure 10:
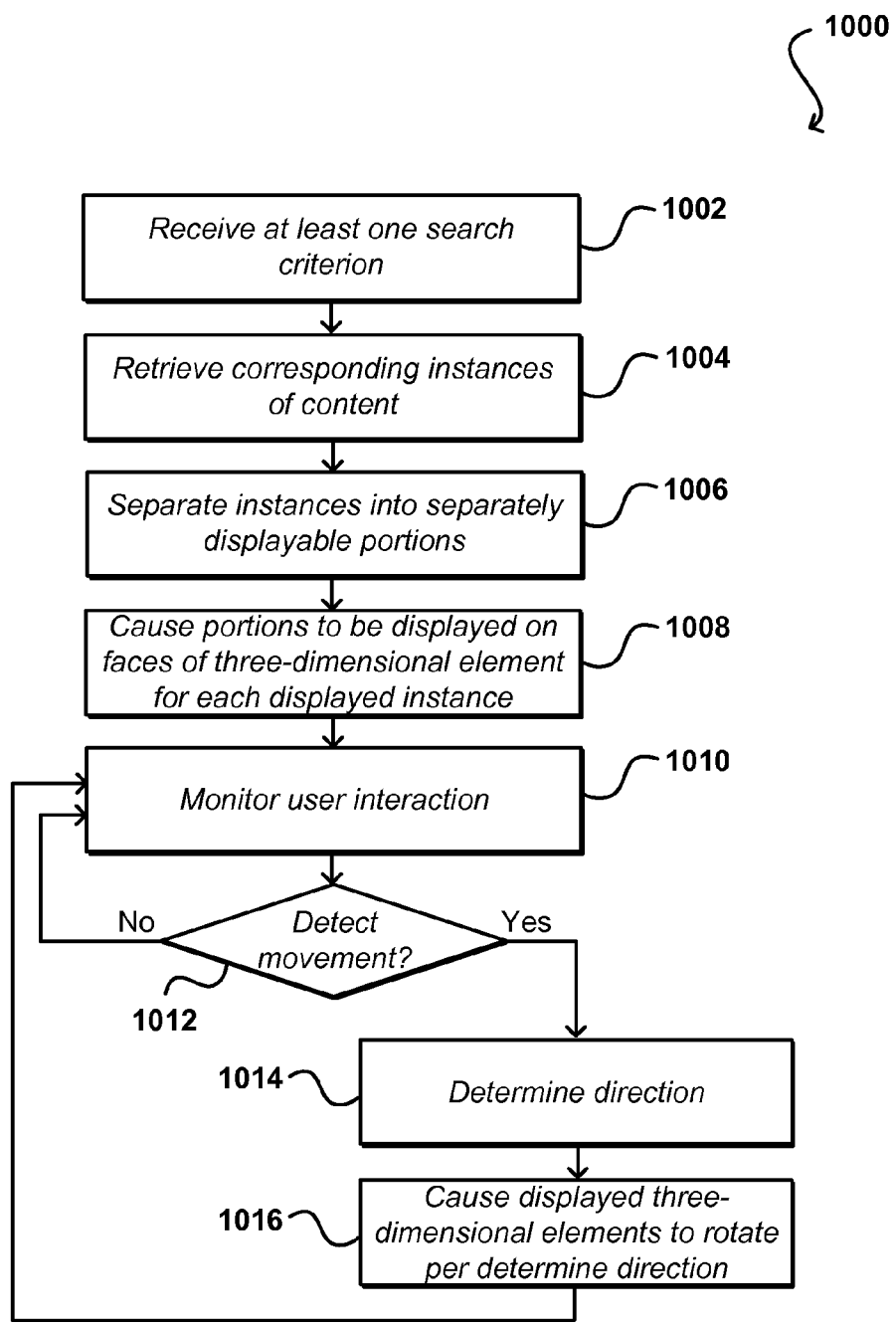
FIG. 10 illustrates an example process for displaying content that can be used in accordance with various embodiments.

FIG. 10 illustrates an example process 1000 for displaying content to a user that can be used in accordance with various embodiments. It should be understood for any process described herein that there can be additional, fewer, or alternative steps performed in similar or differing orders, or in parallel, within the scope of the various embodiments. In this example, at least one search criterion is received from a user, application, or other such source 1002. As discussed, this can involve receiving a search query or browse request from a user of a computing device, etc. Instances of content (e.g., search results) can be retrieved that correspond to, or match, the at least one search criterion 1004. As discussed, this can involve any appropriate process, such as may include submitting search criteria to a search service operable to execute the search against at least one search index and return an ordered or ranked set of search results. At least a portion of the search results can be selected for display, and the selected results can be divided into separately displayable portions of the respective instance of content 1006. In some embodiments, this can involve accessing page or product information for each search result, for example, and segmenting the information into specific pieces of content. The pieces of content can be separated using any appropriate information, such as metadata, information tags, category information, data table identifiers, etc. The pieces of content for each instance then can be caused to be rendered and/or displayed on a user device 1008, such as may involve rendering each piece on a side of a three-dimensional element for each instance of content, at least a portion of the instances of content being displayed concurrently on a display of the user device.

As the three-dimensional elements are displayed on the user device, the device can monitor information such as movement of the device or a change in the relative position of a user with respect to the device 1010. Movement in some embodiments can also relate to movement of a mouse or other input mechanism, activation of an input element, etc. If a movement or other such change is detected as an input 1012, the direction corresponding to the input is determined 1014 and the display of the three-dimensional content elements can be updated to reflect a rotation or other change in orientation corresponding to the direction 1016. As discussed, this can relate to a rotation of the element, but can also result in a change such as the size, shape, or viewable size of at least one content element in the display. Various other such inputs and/or actions can be utilized as well within the scope of the various embodiments.

In addition to the side, face, or other viewable portion of a three-dimensional content object, there can be other aspects changed as well in response to a change in orientation or other such input. Further, a user can combine the movement or orientation input with other information in order to provide a more robust interface that enables a user to more easily compare specific aspects of the various instances of content. In some embodiments, there can be multiple dimensions used to sort or re-arrange the various content elements. For example, a first criteria can be used to sort elements along an X-axis, or shift content elements left or right in the display, for example. In one embodiment, items could be ranked from left to right in order of increasing price. A second criteria such as user rating could then be used along a second dimension, such as along a Y-axis to shift items up or down along a plane substantially parallel to the primary plane of the display screen, or along a Z-axis to shift items forward or backward along a direction orthogonal to the primary plane of the display screen. In some embodiments, three different criteria can be used to sort along the three dimensions. In the example above, a user can see the least expensive but most highly rated items to the top left, and the most expensive but most lowly rated items to the bottom right. Various other approaches can be used as well to shift or adjust by various criteria. For example, items provided by a certain manufacturer could be highlighted, and items having a certain specified option can be in a block of a different color or size, etc.

Figure 11:
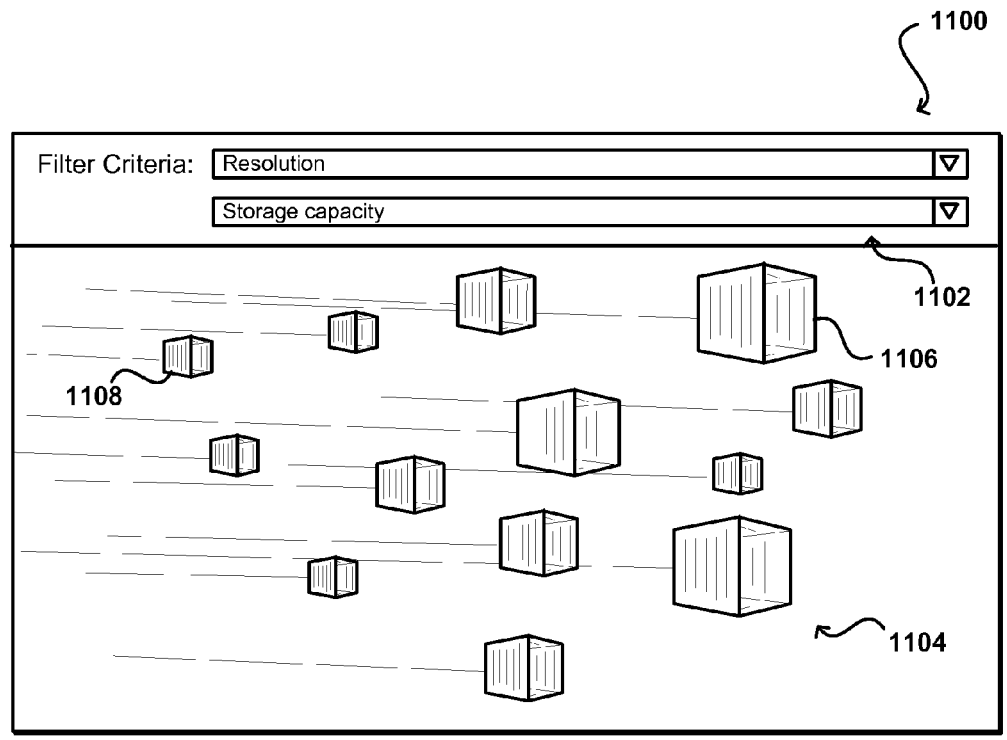
FIG. 11 illustrates an example of a display that can be generated in response to a user applying filter criteria to a set of results in accordance with one embodiment.

For example, FIG. 11 illustrates and example of a display 1100 where a user has performed a rotation or other input such that a side portion of each content element 1104 is displayed. As discussed, the content elements could have been determined using any appropriate input, such as a user submitting a search query such as "digital camera" through a search input element, etc. As known in the art, search results and/or search queries can be narrowed by adding one or more filtering elements or additional criteria. In this example, a user is able to select one or more filtering criteria 1102 to use in displaying the instances of content. In this example the criteria are selected by utilizing drop-down elements that include specific criteria utilized by the system or service to categorize, sort, or otherwise differentiate the search results. For example, in this display a user browsing digital cameras is able to select filter criteria that are appropriate for digital cameras, such as resolution and storage capacity. In some embodiments, such criteria would be used to change which instances of content are displayed, such as by changing the selection based on an updated ordering or removing instances that do not meet a certain criterion.

As illustrated in the example display 1100 of FIG. 11, however, such information can be used to update a position in three-dimensional space of each of the three-dimensional content elements 1104. As can be seen in the example, certain boxes appear larger in the display, representing the fact that those boxes are "closer" to the display in three dimensional space. For example, content instance 1106 is displayed much larger than content instance 1108 to indicate that instance 1106 is ranked much higher based on the filtering criteria. The elements also can include additional graphical elements to give the impression of relative position in three-dimensional space. Each time a criterion is added, removed, or updated, the rendering of relative positions of the content instances in space can adjust accordingly. As a result is ranked more highly in this example, the rendering of the three-dimensional content element can move "up" in space, such that a user can see that the corresponding item is ranked more highly based on the selected criteria. If viewed from the default viewing angle (e.g., directly above) then the boxes might have representative changes in size, or the boxes from above might all look substantially the same size for purposes of simple comparison. In some embodiments, it is only when the user causes the display to rotate to the side that the three-dimensional filtering aspects become apparent.

As discussed, a user can have the ability to provide multiple ranking and/or refining criteria. As known in the art, the ranking of the value of different attributes can be performed in any of a number of different ways. In some embodiments, a straight linear combination can be used to apply the various ranking criteria. In other embodiments, a user can have the ability to prioritize the various criteria, such that different weights can be applied to each. Other suitable approaches can be used as well, such as to utilize a logit calculation or regression to determine a probability of choice or relevance, etc. For example, if a user considers "price" to be moderately important (such as might have a value of 4 on a scale of 10, where 10 signifies "most important"), and the user considers a parameter such as "lightweight" to be very important (such as might have a value of 10 out of 10), and if there is a camera with a price that is below 80% of all cameras and a weight that is lighter than 60% of the cameras, the applicability of that camera for that user could be calculated in at least one embodiment as 4*0.8+10*0.6=9.2, out of a possible score of 14. And in some embodiments the possible scores can be normalized to obtain consistent results across all parameters, instances of content, etc.

In some embodiments, there are separate motions for rotating the boxes individually, as discussed with respect to FIGS. 4(*a*) and 4(*b*), and rotating the "camera viewpoint" with respect to the boxes, as illustrated in FIG. 11. For example, a simple rotation of the device might cause the boxes to rotate. By holding down a specific button and rotating the device, however, the camera position can move such that the relative positions in space of the various content elements can be viewed as well.

Figure 12A:
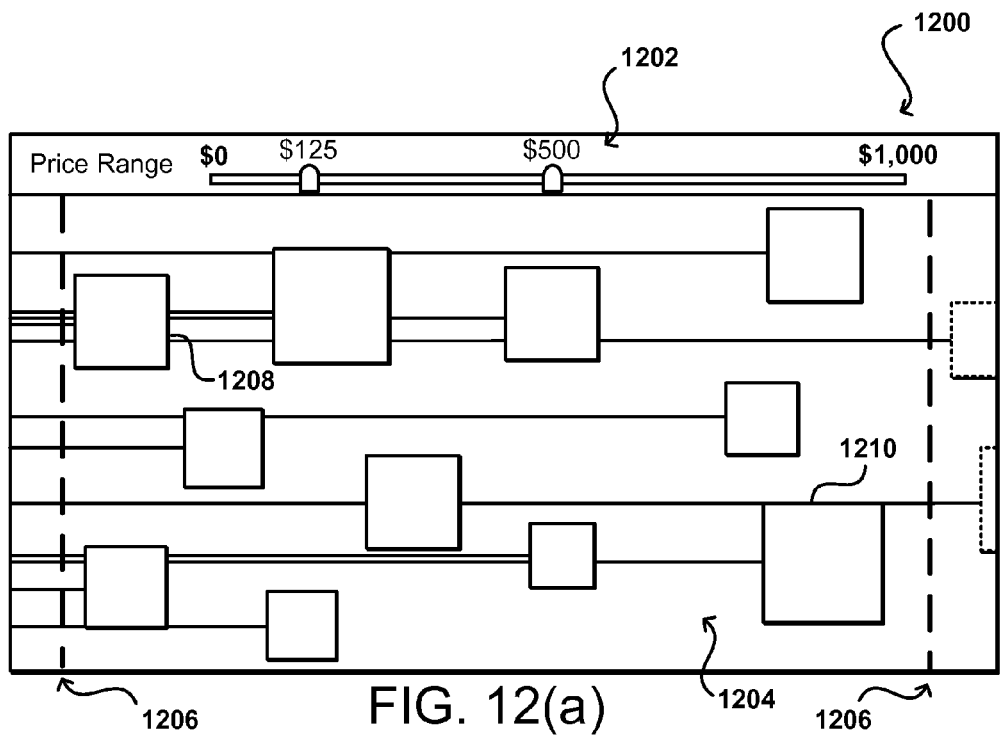
FIGS. 12(a)-(c) illustrate examples of displays that can be generated in response to a user specifying at least one specific range of values for content criteria in accordance with one embodiment.
Figure 12B:
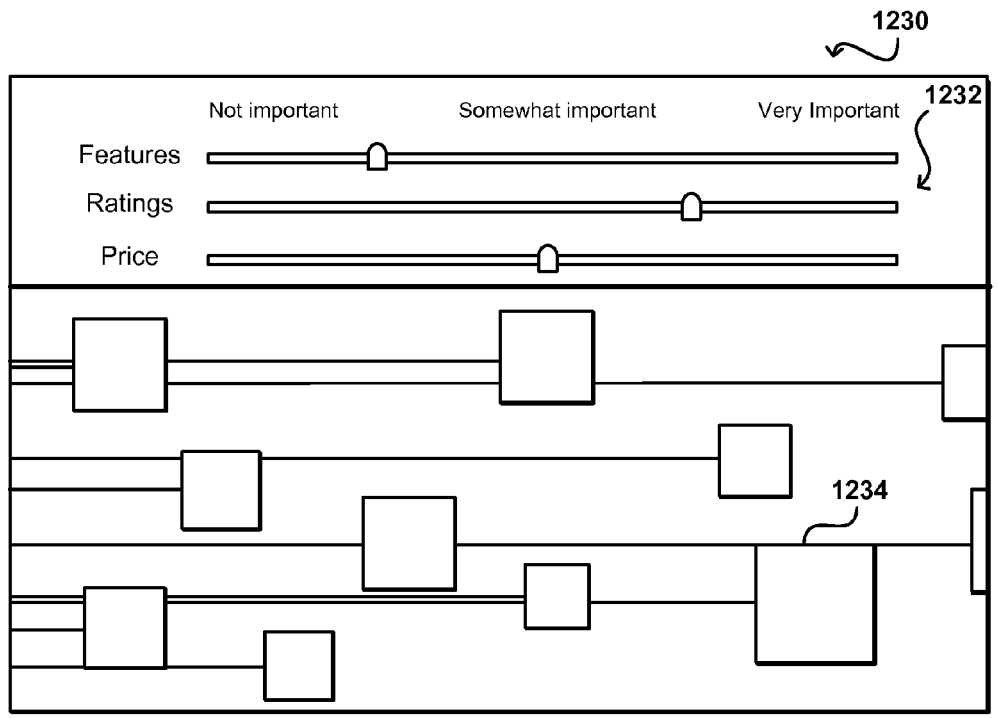
Figure 12C:
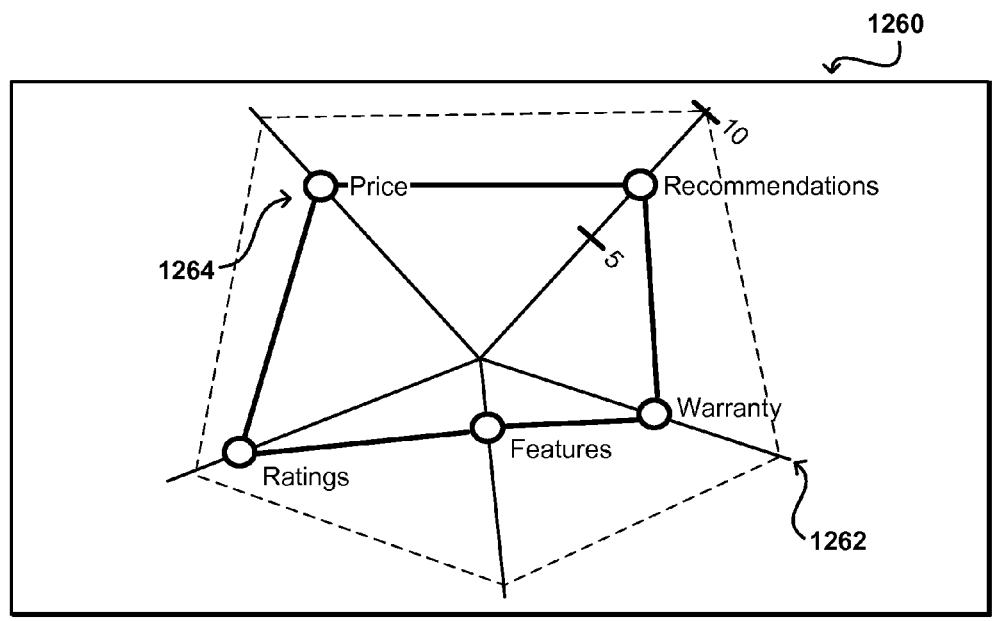

FIG. 12(*a*) illustrates an example display 1200 wherein the camera position has been rotated such that each box is seen from the "side," (with respect to the default display position) such that the full difference in relative position (e.g., along a z-axis) can be determined. Instead of the "up" or "down" relation described above, this view is from the side (with "up" now running from left to right in the plane of the figure) such that the separation between content elements directly corresponds to the differences based on the filtering criteria. In this example, however, the criteria relate to specified range values of a parameter 1202, here specifying a minimum and a maximum price value. The display also can include indicators 1206, such as lines or virtual planes, that represent the specified values of the range. In this example, the leftmost line represents the low end of the specified range, or $125, and the rightmost line represents the high end of the specified range, or $500, although relative orientations, values, and other such information can vary between embodiments. Using this orientation, the user can quickly determine that content element 1208 is less expensive than content element 1210, and by how much. In some embodiments, the user can "lock in" this view, from a camera perspective, and then rotate the device or otherwise cause the individual boxes to rotate, such that the user can still see the various sides of each box and compare the information for each item, but can do so in the context of the filtering criteria or range specified. In some embodiments, the display might only include those elements that fall within the specified range. In other embodiments, as shown in FIG. 12(*a*), the elements falling outside the specified range also can be viewable, such as by performing a specific view rotation or other such action. These items can be changed in at least one of color, brightness, color depth, or another such aspect, to further designate that these elements do not fall within the specified range, which might otherwise not be clear at certain viewing angles.

In some embodiments, a user might wish to apply more than one filtering criterion. In FIG. 12(*b*), for example, the user wants to filter the elements by the relative number of features, the relative user ratings, and the relative price. As discussed, these filtering criteria can be utilized in a straightforward fashion where each criterion essentially receives an equal weighting. In at least some cases, however, at least one of these criteria will be more important to the user than at least one other criterion. For example, the user might be willing to pay more for a camera with excellent user ratings, that is not too expensive, and may not care whether the camera has a lot of features that the user might never use. In this example, the interface 1230 can provide the ability for the user to provide relative weightings for at least some of the specified criteria. In this example, slider bars 1232 are provided for each criterion, which allows the user to specify how important each feature is to the user, from "not important" of the left of each bar to "very important" on the right of each bar. By adjusting the relative importance of each criterion, a user can more easily determine elements that match the user's interest. Further, a user can have the ability to adjust relative weightings to see how the display changes. For example, a user can slide the price slider all the way to the left such that price is factored out of the equation and camera results are filtered based on ratings and features alone.

FIG. 12(*c*) illustrates another example interface 1260 that can enable a user to adjust the relative importance, or preferences, of a set of filtering criteria in accordance with one embodiment. In this example, each of the filtering criteria is assigned to an axis 1262 of a radar chart, with each axis having a scale such as a scale from 0 to 10, with 10 being very important. A user can adjust a position of a significance slider 1264 or other selection element for each of the criteria to adjust a relative weighting. Such an interface can be displayed in the same window or pane as the three-dimensional elements, or can be displayed separately as part of a control window or other such option, etc.

Figure 13:
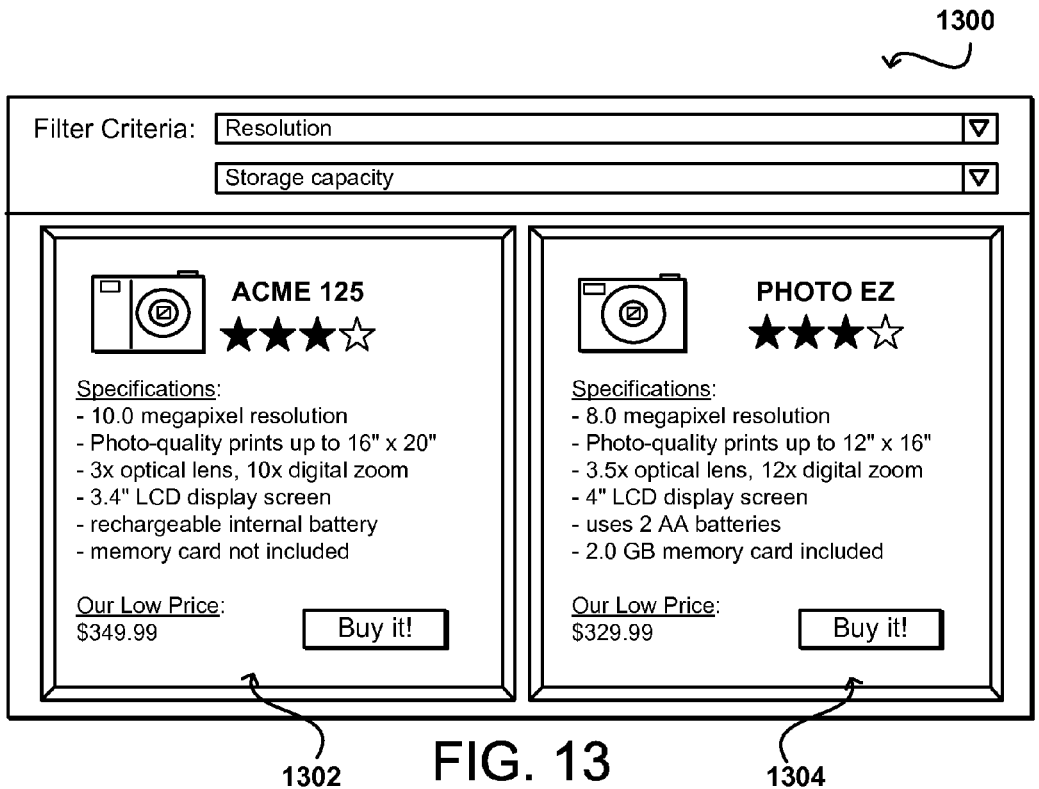
FIG. 13 illustrates an example of a display enabling a user to compare specific items of content in accordance with one embodiment.

As should be apparent, at some point a user might like to obtain additional information about one or more of the instances of content, or compare specific instances of content. As discussed, users can perform a selection action with respect to at least one content element, such as by tapping on the element using a touch screen, double clicking a cursor on the element, or otherwise selecting one or more elements. FIG. 13 illustrates an example display 1300 wherein a user has selected two instances of content to be displayed, although a single instance or additional instances can be viewed in accordance with other embodiments. In this example, a user selected two instances and information for both of those instances is displayed in a larger area on the display screen. In some instances the three-dimensional content elements can be maintained, including the sides and ability to rotate, while in other embodiments selected items will cause small windows, panels, or other types of pages of information to be displayed that can contain more detailed information, or can contain information that was previously contained on multiple sides or faces, etc. This example shows detailed information views 1302 for two selected items. In this example where the items are offered for consumption through an electronic marketplace, the user can also have an option to buy a selected item directly from the displayed content using a purchase element 1304 or other such input. As should be understood, the individual content elements also can each include a purchase option, or similar options, in any of the previous views discussed above. Other options can be displayed as well, such as options to download specific content, navigate to a particular page or site, listen to a particular song, etc. Any appropriate end action for a selected instance of content that can be represented by at least one input element (e.g., button or link) can be represented on any particular side, face, or area of a displayed content element. For items offered for sale, for example, a purchase button might be included on each face to allow for easy purchase, etc.

In some embodiments, the user can select specific items such as is displayed in FIG. 13 and then apply filtering criteria, such that the user can change the camera view to visually compare only the selected items based on specific criteria, instead of having to read the specifications for each, etc. The user also can have the ability to rotate the elements, or perform any operation discussed herein, with respect to the selected elements.

Figure 14:
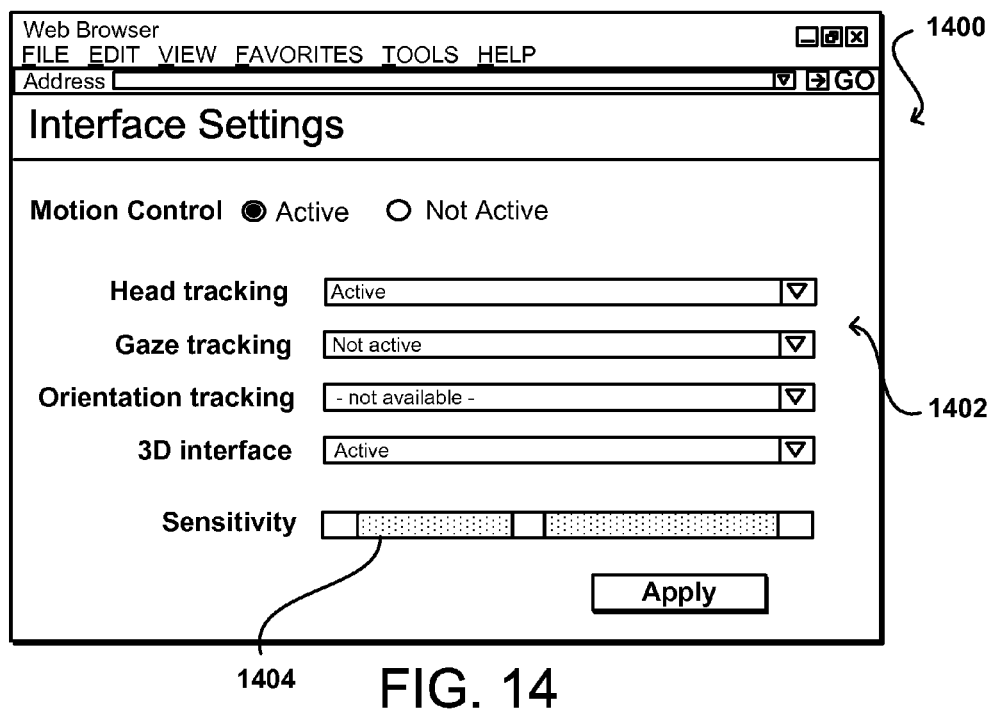
FIG. 14 illustrates an example of an interface page enabling a user to specify aspects of an interface that can be used in accordance with one embodiment.

As discussed, a user can have the ability to configure how inputs are provided for a particular computing device. FIG. 14 illustrates an example of a configuration interface 1400 that can be used in accordance with one embodiment. In this example, there are several options 1402 provided that can be configured by the user. For example, the user can determine whether to activate motion control at all, as opposed to using conventional input such as a touch screen, keyboard, or mouse. The user also can specify the types of motion to use, such as head or gaze tracking if the device has at least one imaging element, or orientation tracking if the device has at least one orientation determining element, such as an accelerometer for a portable device. The user can also adjust other aspects, such as the three-dimensional interface rendering, as well as the sensitivity of the device motion, etc. For example, some users might not want to have to tilt the device very much, such that they are able to see the screen more clearly, while other users might want to have to rotate or tilt the device a larger amount in order to have more precise control over the amount of rotation of the display elements, etc. Various other such settings can be used as well as should be apparent to one of ordinary skill in the art.

Figure 15:
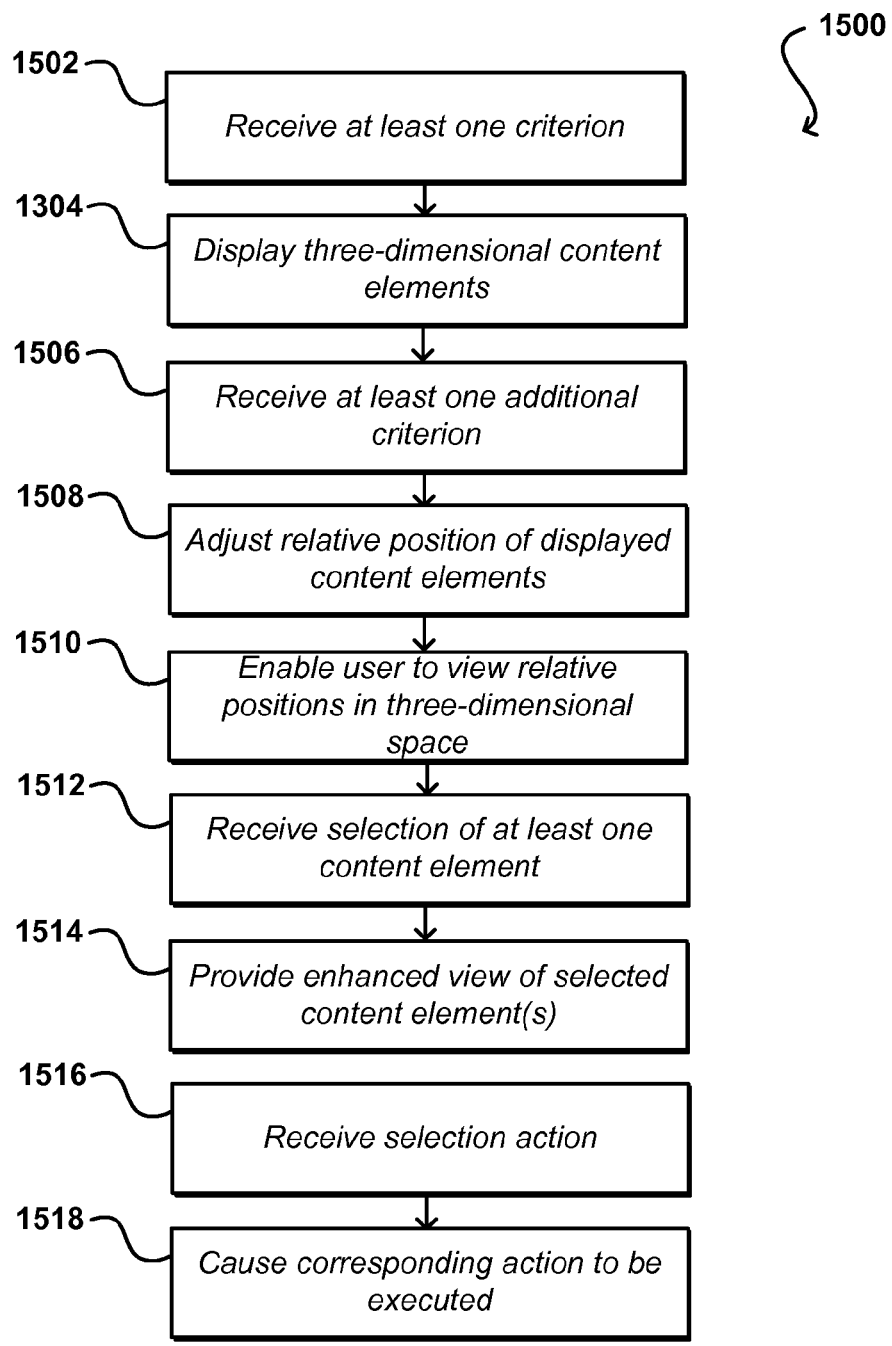
FIG. 15 illustrates an example process for executing an action with respect to selected content in accordance with various embodiments.

FIG. 15 illustrates steps of a process 1500 for locating and purchasing an item that can be used in accordance with various embodiments. In this example, at least one criterion is received 1502 that is used to locate corresponding content and display instances of content using three-dimensional display elements 1504. The process for generating and displaying the elements can include any appropriate steps discussed herein, such as are described with respect to the process of FIG. 10.

After the instances of content are displayed as an array or other assortment of three-dimensional elements, and the user has had an opportunity to investigate and compare information for each of the elements, at least one additional criterion can be received from the user 1506, such as by the user selecting at least one filtering criterion or specifying a range of values for a given attribute, etc. The relative position of the three-dimensional content elements in three-dimensional space then can be updated based at least in part upon the additional criteria 1508. As discussed, this can involve essentially moving the content elements with respect to a three-dimensional graph, such as by moving a relative position of certain content elements toward, or away from, the plane of the display screen, or otherwise adjusting a relative position such that when the user rotates a camera view, or point of view with respect to the displayed content instances, the differences in position can readily be determined. The user then can be able to adjust the view to view the relative positions in three-dimensional space 1510, and in some embodiments can see an animated movement of the elements as criteria or ranges are added, removed, or updated, etc.

At any appropriate point while viewing the displayed content elements, a selection can be received from the user with respect to one or more of the displayed content elements 1512. As discussed, this can involve a single element for which the user desires additional information, or can include two or more elements that the user wishes to compare. A more detailed (or at least enlarged) view is provided to the user based at least in part upon the selection 1514. If multiple instances are selected, the user can compare different aspects of those instances by rotating the content elements, adjusting the camera angle, etc.

Also at any appropriate point, which can vary between embodiments, a selection action can be received from the user regarding at least one of the displayed content elements 1516. In an electronic shopping environment, this can relate to a user selecting an option to purchase at least one item associated with a content element, while in other embodiments this can involve downloading or navigating to specific content or performing any other appropriate action discussed elsewhere herein. Upon receiving the selection action, the system can cause any corresponding action to be executed 1518, such as to effect a purchase transaction or initiate a transaction with a third party, cause information to be available for download to the user, etc. Other variations are possible as well within the scope of the various embodiments.

While many of the examples discussed above relate to searching for specific content using a search query, set of links, or other such approach, it should be understood that other approaches to locating content, such as browsing or navigating without any particular end point in mind, can also be provided by such interfaces within the scope of the various embodiments. For example, instances of content might be organized using a hierarchical categorization tree, wherein subcategories can be thought of as residing underneath the parent categories, or parent nodes, in the tree. A three-dimensional organizational approach such as that described with respect to FIGS. 11-12 can be used to enable a user to quickly navigate to a category or subcategory of interest. For example, a user visiting a home page of an electronic marketplace might see a three-dimensional arrangement of blocks where top level nodes such as "books" or "electronics" might be displayed at the top of the three-dimensional space, while subcategories such as "digital cameras" and "books about World War II" might be displayed lower in the three-dimensional space. A user can rotate, zoom, or otherwise manipulate the display in three-dimensional space until the user locates a category or subcategory of interest, and then can select that particular subcategory. An animation can be used to "zoom" to that subcategory, or have the other levels fly out of the display area, etc., and a set of instances of content for that subcategory then can be retrieved and displayed, such as is described with respect to FIG. 3(*a*). Various other approaches, including applying filtering criteria and ranges, can be used with the categorization or browsing approach as well. In some embodiments, sub-categories can be included as content elements for a given category, either in the same space as the content elements corresponding to specific instances of content, or in a different area. In some embodiments, the sub-categories can be shown at a lower level of the category in three-dimensional space, etc.

As with the content elements, a user can have the ability to select multiple categories, which then can be used to generate content elements for display. For example, a user browsing the categorization display could select "classical music compact discs" and "classical music DVDs". The resulting selection and display of content elements could include blocks for both categories, which could be sorted or organized using any similar criteria, ranges, or other aspects discussed herein.

A user also can have the ability to move back up to a higher categorization level. In some embodiments, this can involve a user selecting a specific button, input, or option to zoom back out to a higher level. In other embodiments, the user can rotate the view to obtain a side view, for example, and can perform a movement or input that allows other categorization levels to be viewed and/or accessed, such that the user relies upon the three-dimensional aspects of the interface to move between different levels and/or types of content, etc.

Another approach to generating a starting point for the three-dimensional interface is to select one or more specific items, such as by browsing or otherwise navigating to a specific page or piece of content. For example, a user browsing a Web site might select or specify one or more items (e.g., two cameras) in which the user is potentially interested. The user then can select an option to launch a three-dimensional product comparison interface, which can select items or content related to the initial selection, such as cameras with similar attributes, etc. The user can then sort, filter, and/or compare the initially selected items with various similar items, see related items or content, etc.

Such an approach also can be useful as a way to recommend or find related products or content. For example, a user might purchase an item that the user really likes, and would like to find similar items of interest. The user could locate a page corresponding to the purchased item, and could launch the three-dimensional content interface to see similar items, sort those items by specific criteria, etc. Such an approach might work well for content such as movies, for example, where a user can receive a selection of movies similar to a movie that the user enjoyed, and can sort the movies based on factors such as rating, year of first release, etc. A user also can specify certain criteria, as discussed above, that causes certain content to be excluded. For example, a user could specify a rating range that goes from General ("G") to Parental Guidance Suggested ("PG"), whereby movies with a Restricted ("R") or other higher rating would be removed from display, moved to a higher or lower level, adjusted in color or brightness, or otherwise removed from primary viewing position, etc. In certain embodiments, these outside elements can be viewed again through a combination of movement, rotation, and/or translation using various approaches discussed or suggested herein.

Certain instances of content also can be emphasized for any of a number of different reasons, using any of the appropriate mechanisms discussed herein. For example, a user viewing a set of content elements might see certain elements initially higher or larger than other elements, of a different color or size, etc. Such mechanisms can be used to highlight content for any of a number of reasons, such as to bring attention to a new item, highlight content where an advertiser or provider has paid for emphasis, feature certain items, etc. Such mechanisms also can be used to recommend or highlight items that likely are of interest to the user, such as may be based upon personalization or preference information for the user. The preference information also can be used to weight or adjust various ranking criteria, or apply additional ranking criteria, etc. When a user specifies certain criteria for an item, that information also can be stored as preference information for that user, specifically or in general. Such preference information can be desirable to providers and manufacturers alike, as information can be obtained as to the primary criteria or ranges where users search for a specific type of product or information, for example. While some embodiments enable a user to opt in, or opt out, of such data collection for privacy reasons, the use of the interface can be tracked at least for provider use in suggesting or ranking certain items, etc.

The criteria, filters, ranges, or other information used to search for and/or view content also can be saved for subsequent retrieval. For example, a user might have to end a session before completing a search, and may want to come back to the same point at a later time. In other embodiments, a user might want to save a certain set of criteria, etc., such that the user can come back at a later time to find new assortments of content that meet those criteria, etc. Users also can have the ability to send the criteria, etc., to other users to enable those users to see a similar collection or arrangement of information, and can even post such information (via links, etc.) to social networking sites, etc.

Information about purchases also can be used to suggest products to a user. For example, a user viewing or searching for an item can see a three-dimensional assortment of products that relate to items viewed or purchased by similar users, or users viewing the same item, etc. Various methods of suggesting content are known in the art, and it should be apparent that many of these can advantageously take advantage of aspects of the various embodiments.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Pert, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of displaying content using a computing device, comprising:
receiving a search query;
determining a plurality of instances of content, relating to the search query,
the plurality of instances of content comprising a first instance of content and a second instance of content,
the first instance of content comprising a first aspect and a second aspect,
the second instance of content comprising a third aspect and a fourth aspect;
displaying, according to a user-adjustable criteria, a first multi-sided three-dimensional element in a two-dimensional display, the first multi-sided three-dimensional element corresponding to the first instance of content;
displaying, according to the user-adjustable criteria, a second multi-sided three-dimensional element, in the two-dimensional display, the second multi-sided three-dimensional element corresponding to the second instance of content;
displaying the first aspect on a first side of the first multi-sided three-dimensional element;
displaying the second aspect on a second side of the first multi-sided three-dimensional element;
displaying the third aspect on a first side of the second multi-sided three-dimensional element, the first aspect and the third aspect being a first common type of information;
displaying the fourth aspect on a second side of the second multi-sided three-dimensional element, the second aspect and the fourth aspect being a second common type of information, the first common type of information being different than the second common type of information;
determining a first rotation of the computing device, with respect to a user, based at least in part upon a first input detected by at least one sensor of the computing device;
determining a first filtering criterion;
displaying an updated presentation display for the first multi-sided three-dimensional element and the second multi-sided three-dimensional element, based at least in part upon the first filtering criterion and a direction of the first rotation of the computing device, wherein the first aspect of the first instance of content and the third aspect of the second instance of content are emphasized relative to the second aspect and the fourth aspect based on the direction of the first rotation, and the first multi-sided three-dimensional element is displayed larger than the second multi-sided three-dimensional element based on the first filtering criterion;
in response to a first selection of the first instance of content, generating a detail view of the first instance of content;
determining a second rotation of the computing device, with respect to a user, based at least in part upon a second input detected by at least one sensor of the computing device; and
displaying additional information associated with the first instance of content, based at least in part upon a direction of the second rotation of the computing device.

2. The computer-implemented method of claim 1, further comprising:
displaying the second multi-sided three-dimensional element larger in the display of the computing device relative to the first multi-sided three-dimensional element.

3. The computer-implemented method of claim 2, further comprising displaying a visual transition between displaying the first multi-sided three-dimensional element larger in the display and displaying the second multi-sided three-dimensional element larger in the display.

4. The computer-implemented method of claim 3, wherein a speed of the visual transition is based at least in part on an amount of the first rotation of the computing device.

5. The computer-implemented method of claim 1, further comprising:
displaying a first image of a plurality of images associated with the first instance of content; and
displaying a second image of the plurality of images, based at least in part upon the direction of the second rotation of the computing device.

6. The computer-implemented method of claim 1, further comprising, clearing the display of the additional information.

7. The computer-implemented method of claim 1, further comprising:
determining a second filtering criterion corresponding to a range of values; and
displaying the updated presentation display based on a weighted combination of the direction of the first rotation, the first filtering criterion and the second filtering criterion, wherein the first multi-sided three-dimensional element and the second multi-sided three-dimensional element are arranged according to the range of values.

8. A computing device for displaying content, comprising:
at least one processor; and
at least one memory device including instructions that, when executed by the at least one processor, cause the at least one processor to:
receive a search query;
determine a plurality of instances of content, relating to the search query,
the plurality of instances of content comprising a first instance of content and a second instance of content,
the first instance of content comprising a first aspect and a second aspect,
the second instance of content comprising a third aspect and a fourth aspect;
display, according to a user-adjustable criteria, a first multi-sided three-dimensional element in a two-dimensional display, the first multi-sided three-dimensional element corresponding to the first instance of content;
display, according to the user-adjustable criteria, a second multi-sided three-dimensional element in the two-dimensional display, the second multi-sided three-dimensional element corresponding to the second instance of content;
display the first aspect on a first side of the first multi-sided three-dimensional element;
display the second aspect on a second side of the first multi-sided three-dimensional element;
display the third aspect on a first side of the second multi-sided three-dimensional element, the first aspect and the third aspect being a first common type of information;
display the fourth aspect on a second side of the second multi-sided three-dimensional element, the second aspect and the fourth aspect being a second common type of information, the first common type of information being different than the second common type of information;
determine a first rotation of the computing device, with respect to a user, based at least in part upon a first input detected by at least one sensor of the computing device;
determine a first filtering criterion;
display the first multi-sided three-dimensional element and the second multi-sided three-dimensional element in an adjusted relative position, based at least in part upon the first filtering criterion and the first rotation of the computing device, wherein the first aspect of the first instance of content and the third aspect of the second instance of content are emphasized relative to the second aspect and the fourth aspect based on the first rotation, and the first multi-sided three-dimensional element is displayed larger than the second multi-sided three-dimensional element based on the first filtering criterion;
in response to a first selection of the first instance of content, generate a detail view of the first instance of content;
determine a second rotation of the computing device, with respect to a user, based at least in part upon a second input detected by at least one sensor of the computing device; and
display additional information associated with the first instance of content, based at least in part upon a direction of the second rotation of the computing device.

9. The computing device of claim 8, further comprising instructions, that when executed by the at least one processor, cause the at least one processor to:

display the second multi-sided three-dimensional element larger in the display of the computing device relative to the first multi-sided three-dimensional element.

10. The computing device of claim 9, further comprising instructions, that when executed by the at least one processor, cause the at least one processor to display a visual transition between display the first multi-sided three-dimensional element larger in the display and display the second multi-sided three-dimensional element larger in the display.

11. The computing device of claim 10, wherein a speed of the visual transition is based at least in part on an amount of the first rotation of the computing device.

12. The computing device of claim 8, wherein the detail view comprises a display of a first image of a plurality of images associated with the first instance of content, and display of a second image of the plurality of images, based at least in part upon a direction of the second rotation of the computing device.

13. The computing device of claim 8, wherein second additional information associated with the first instance of content is associated with a different direction of the second rotation of the computing device.

14. The computing device of claim 8, wherein display the first multi-sided and second multi-sided three-dimensional elements in the adjusted relative position comprises shift the first multi-sided and second multi-sided three-dimensional elements forward or backward along a z-axis, wherein the z-axis is orthogonal to the primary plane of the display.

15. The computing device of claim 14, wherein a direction of shifting the first multi-sided and second multi-sided three-dimensional elements forward or backward along the z-axis corresponds to a direction of the first rotation of the computing device.

16. The computing device of claim 14, wherein a speed of shifting the first multi-sided and second multi-sided three-dimensional elements forward or backward along the z-axis is based at least in part on an amount of the first rotation of the computing device.

17. The computing device of claim 8, further comprising instructions, that when executed by the at least one processor, cause the at least one processor to:
   determine a second filtering criterion corresponding to a range of values; and
   display the updated presentation display based on a weighted combination of the direction of the first rotation, the first filtering criterion and the second filtering criterion, wherein the first multi-sided three-dimensional element and the second multi-sided three-dimensional element are arranged according to the range of values.

18. A non-transitory computer-readable storage medium storing instructions for displaying content, the instructions when executed by at least one processor causing the at least one processor to:
   receive a search query;
   determine a plurality of instances of content, relating to the search query,
   the plurality of instances of content comprising a first instance of content and a second instance of content, the first instance of content comprising a first aspect and a second aspect,
   the second instance of content comprising a third aspect and a fourth aspect;
   display, according to a user-adjustable criteria, a first multi-sided three-dimensional element in a two-dimensional display, the first multi-sided three-dimensional element corresponding to the first instance of content;
   display, according to the user-adjustable criteria, a second multi-sided three-dimensional element in the two-dimensional display, the second multi-sided three-dimensional element corresponding to the second instance of content;
   display the first aspect on a first side of the first multi-sided three-dimensional element;
   display the second aspect on a second side of the first multi-sided three-dimensional element;
   display the third aspect on a first side of the second multi-sided three-dimensional element, the first aspect and the third aspect being a first common type of information;
   display the fourth aspect on a second side of the second multi-sided three-dimensional element, the second aspect and the fourth aspect being a second common type of information, the first common type of information being different than the second common type of information;
   determine a first filtering criterion;
   display, based on the first filtering criterion, the first multi-sided three-dimensional element larger on a display element of a computing device than the second multi-sided three-dimensional element;
   determine a direction of a first rotation of the computing device, with respect to a user, based at least in part upon a first input detected by at least one sensor of the computing device;
   based on the direction of the first rotation, display the second multi-sided three-dimensional element larger on the display than a third multi-sided three-dimensional element; and
   remove the first multi-sided three-dimensional element from the display.

19. The non-transitory computer-readable storage medium of claim 18, wherein larger on the display is relative to a viewpoint along a z-axis oriented orthogonally to the display element of the computing device.

20. The non-transitory computer-readable storage medium of claim 18, further comprising:
   determine a second rotation of the computing device, with respect to a user, based at least in part upon a second input detected by at least one sensor of the computing device; and
   display additional information associated with the third multi-sided three-dimensional element.

* * * * *